Feb. 22, 1927.
A. S. THOMPSON
1,618,358
COMBINED LATHE AND DRILL
Filed May 25, 1925　　5 Sheets-Sheet 1
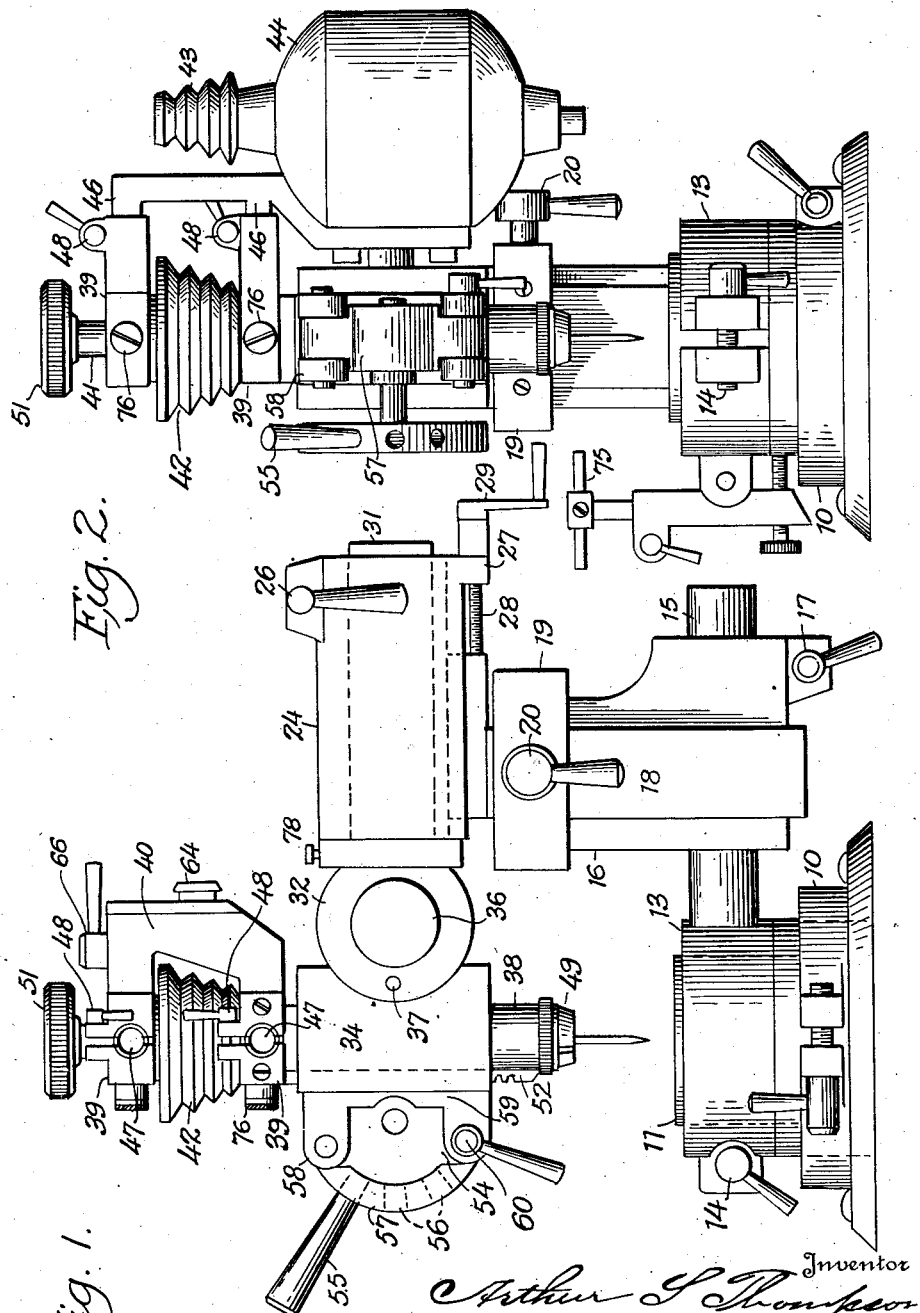

Feb. 22, 1927.
A. S. THOMPSON
1,618,358
COMBINED LATHE AND DRILL
Filed May 25, 1925
5 Sheets-Sheet 2
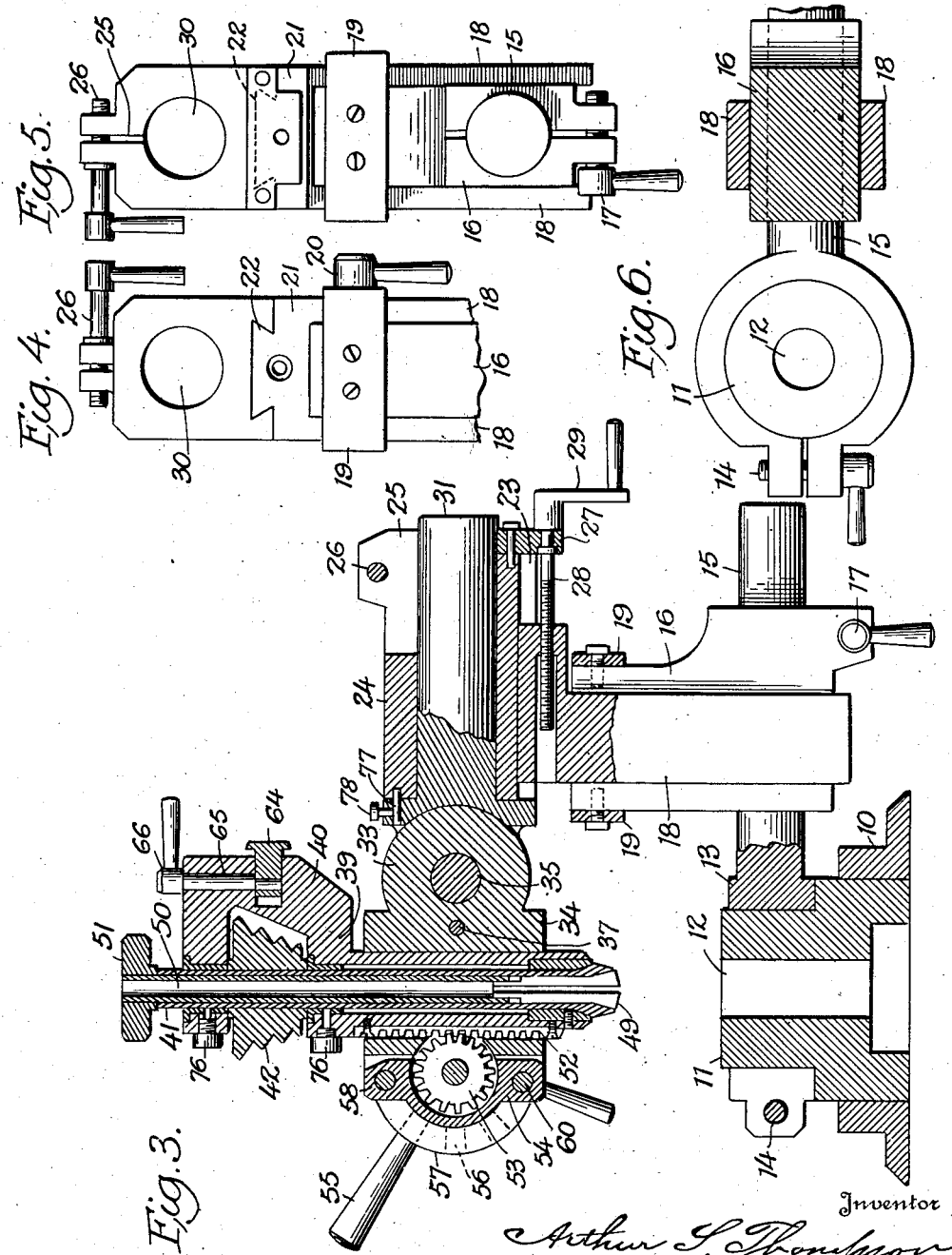
Inventor
Arthur S. Thompson
By
Attorney Feb. 22, 1927.
A. S. THOMPSON
1,618,358
COMBINED LATHE AND DRILL
Filed May 25, 1925    5 Sheets-Sheet 3
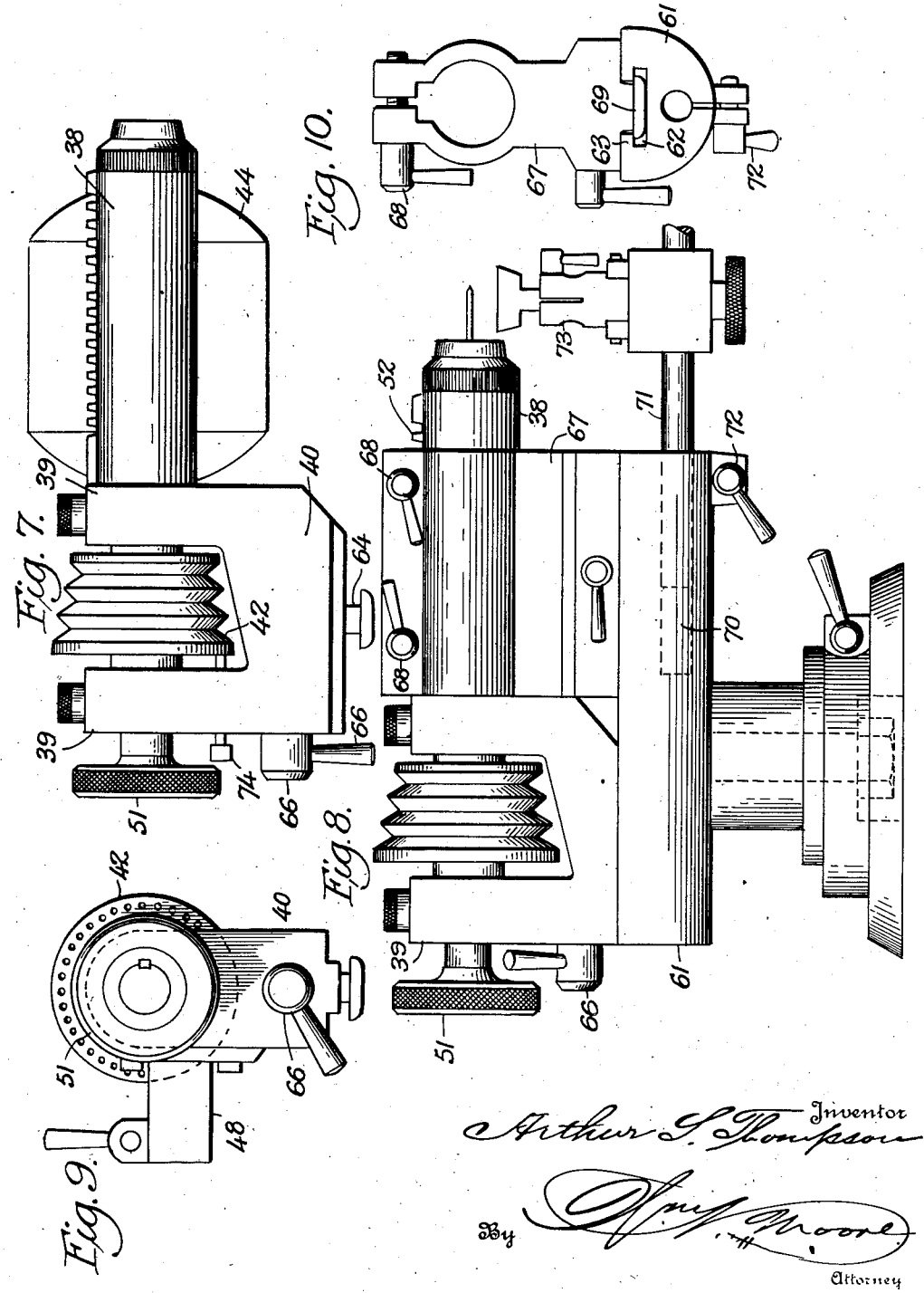

Feb. 22, 1927.
A. S. THOMPSON
1,618,358
COMBINED LATHE AND DRILL
Filed May 25, 1925     5 Sheets-Sheet 4
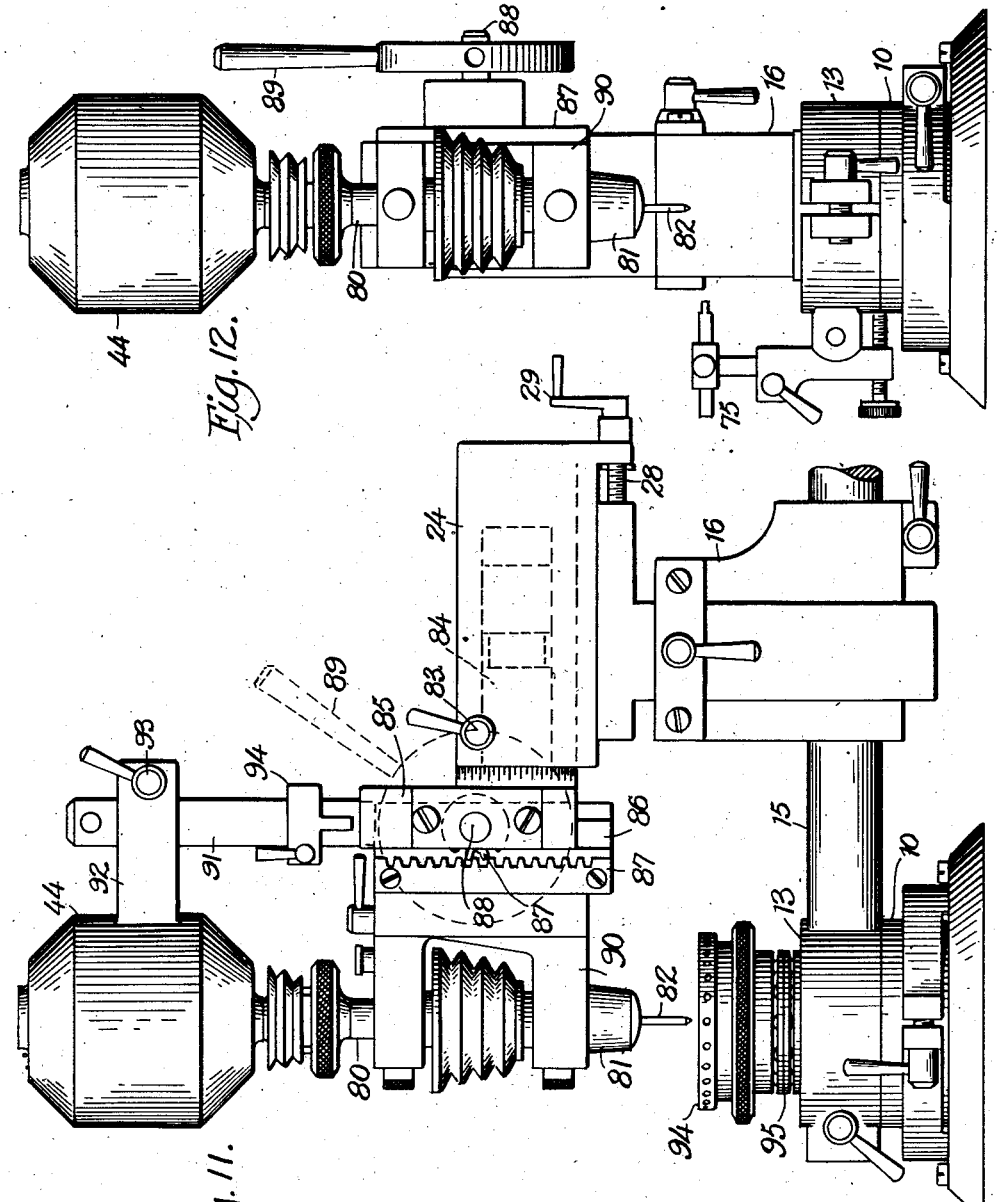
Inventor
Arthur S. Thompson,
By 
Attorney Feb. 22, 1927.  
A. S. THOMPSON  
1,618,358  
COMBINED LATHE AND DRILL  
Filed May 25, 1925   5 Sheets-Sheet 5
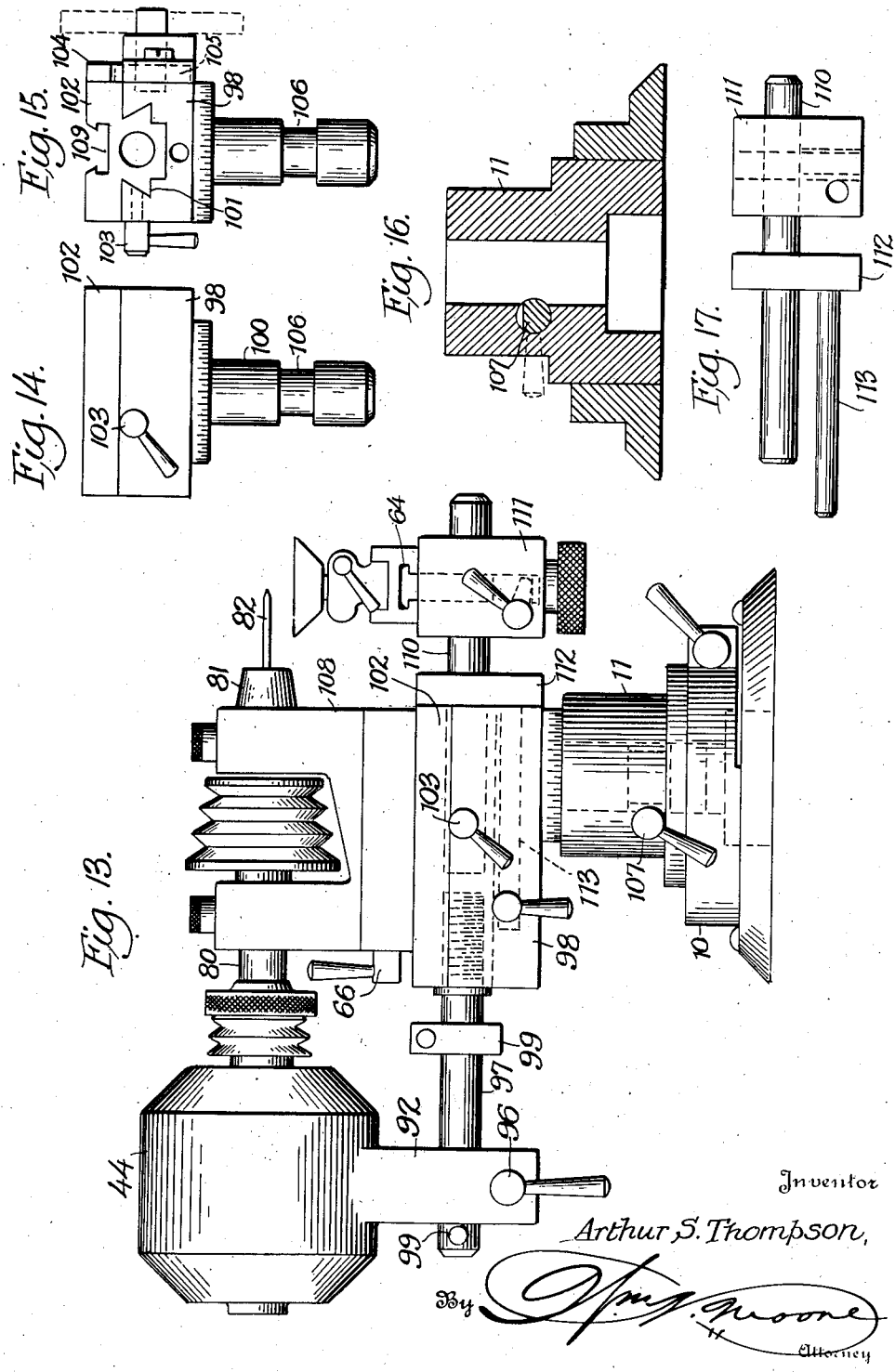

Patented Feb. 22, 1927.

1,618,358

UNITED STATES PATENT OFFICE.

ARTHUR S. THOMPSON, OF ONTARIO, CALIFORNIA.

COMBINED LATHE AND DRILL.

Application filed May 25, 1925. Serial No. 32,749.

This invention relates to metal drills and lathes and especially to that class used by jewelers and where universal movement is provided for the tool so that a great variety of work may be performed on a very small object.

The object of the invention is to secure a tool by means of a chuck and give same a rotary or radial movement and position or to incline the tool away from the vertical at a desired angle and to raise and lower same while being driven by a motor.

Another object of the invention is to provide means for locking these various adjusting means at the desired position to operate on the metal article held by suitable base chuck or work holder.

These and other details and objects of the invention are more fully described in the following specification, set forth in the appended claims and illustrated in the accompanying drawings, wherein:

Figure 1 is a side elevation of the improved drill.

Fig. 2 is a front view of the same.

Fig. 3 is an elevation principally in vertical section.

Fig. 4 is a front view of the head carrying sliding box and its support.

Fig. 5 is a rear view of the same.

Fig. 6 is a plan of the base block and the horizontal bar and its ring.

Fig. 7 is a side view of the device detached from its support.

Fig. 8 is a similar view of the device used as a lathe.

Fig. 9 is an end elevation of the device.

Fig. 10 is an end view of the lathe supporting bar and head, and

Figs. 11 to 17 inclusive are views of modified forms and their details.

The device is arranged in a ring 10 that may be secured to a work bench and that is adapted to contain a base block 11 which may rotate and has a vertical passage 12 to contain the stem of a chuck or work holder of any well known type.

A reduced portion of this block 11 is adapted to receive a ring 13 that is split at one side and has the clamping screw 14 to secure it to the block, while from the ring's opposite side extends a bar 15 preferably round in cross section and is adapted to have clamped to it the standard 16 that is split at its rear side and is secured to the bar by the screw 17, or may be loosened and removed entirely if desired, so that some other tool may be carried on this bar.

Straddling the standard 16 is a yoke 18 adapted to move through the strap 19 that is secured to the standard and be adjusted at any desired height by a screw 20 which plays through the strap. At the top or cross piece 21 of the yoke 18 is a dovetail 22 that is received in a similarly shaped recess 23 in a box 24 also split at its rear end 25 to be acted on by a screw 26 to form a clamp for the purpose hereinafter described.

Swivelled in a plate 27 at the rear end 25 of the box 24 is an adjusting screw 28 which plays in a threaded recess in the cross piece 21 to move the box along the yoke and rest it at any desired location by means of the handle 29.

Fitting within the bore 30 of the box 24 is a cylindrical stem 31 of jaws 32 that hold the hinge member 33 of a head 34 that is pivoted and adapted to swing on the pin 35 and held at any desired angle by threads on the pin and adjusted by the head 36. A permanent vertical position for the drill may be attained by a pin 37 adapted to pass through the jaws and the hinge member, the stem 31 being clamped by the screw 26.

To change the angle of the head, the pin 37 is removed and the head may be swung around on its pivot and held in the new position by the clamping action of the screw head 36.

Adapted to freely move in the head 34 is a barrel 38 having at its upper end jaws 39 united at their yoke 40 and forming bearings for a chuck spindle 41 that carries a cone pulley 42 adapted to be connected by a belt with the pulley 43 on the driving shaft of an electric motor 44, best shown in Fig. 2 where it will be seen supported by a frame 45 having studs 46 that enter openings 47 at the sides of the jaws 39 where they are clamped by the screws 48, but may be readily released and removed.

The lower end of the chuck spindle 41 is beveled on the inside to influence the jaws 49 of the chuck which are operated by inner tube 50 threaded to engage the upper ends of the jaws and raise or lower them against the inclined walls of spindle 41. The tube 50 is rotated by the knob 51 at its upper end and the tool is caught in the clutch thereby.

In order to reciprocate the barrel 38 with the parts that it carries, a rack bar 52 is secured to its side and meshing with the teeth thereof is a pinion 53 rotatable in a frame 54 by means of a handle 55 that may be located in one of the sockets 56 of a wheel or hub 57. The frame 54 is pivoted at its upper end 58 to the outer edge 59 of the head 34 and a pin or screw 60 locks the frame at its lower end to the edge of the head 34. This frame 54 and pinion also serves to retain the barrel in the head but when it is desired to remove the former for other operations the pin 60 is removed and the frame is free to swing upward and the teeth of the pinion and the barrel are disengaged.

In order to convert the device into a lathe the barrel and jaws are removed from the head 34 and the bar 15 removed from the base block 11 and, as shown in Fig. 3, a bar 61 having a stud shown in dotted lines that is adapted to fit in the vertical passage 12 is substituted and on the top of this is located the barrel 38 and its jaws 39.

The upper side of the bar 61 has a groove 62 with shoulders 63 and the detached lathe, as shown in Figs. 3 and 7, has a headed bolt 64 that fits in said groove 62 and engages its shoulders when retracted by the cam-shaft 65 within the uniting piece 40 of the jaws 39 and operated by a handle 66, thus securing the device to the bar. The barrel 38 is in this instance supported at its outer end in a head 67 carried at the other end of bar 61 from the jaws and this block has screws 68 to clamp the barrel and a locking bolt 69 operated as the bolt 64.

Within one end of the bar 61 is a socket 70 to receive a bar 71 that is clamped and held rigid by a screw 72 to carry a rest 73 for the tool that is to operate in conjunction with the lathe.

This latter arrangement of the barrel and its parts as a lathe permits of the use of the motor on the opposite side of the device as shown in Figs. 7 and 8 and when it is desired to lock the chuck at a desired position a pin 74 (Fig. 7) may be passed through one of the jaws 39 and into the pulley 42 where a series of recesses is provided and is shown in Fig. 9.

In this manner the rotating tool carrying members may be used in an upright or vertical position, inclined to any angle between the vertical and horizontal, or it may be readily employed for horizontal operation and sufficient adjuncts are provided for all of these operations.

In Fig. 2 a stop 75 is shown that may be used to secure a work holding clutch when it is desired to use same.

This stop is pivoted and adjustable so that it may be brought into contact with teeth or perforations in the edge of a work holder such as shown in Fig. 11 so as to allow the work to be rotated step by step and operated on at regular intervals around its surface.

Oil ducts 76 are provided in the jaws 39 to provide lubricants for the rotating tube 41 and a pin 77 may be used to adjust the jaws 33 at any desired angle on the axis of the stem 31 by entering one of a series of sockets around the box 24 and be secured by screw 78.

It is obvious that the parts may be otherwise arranged or modified without departing from the essential features above described or from the scope of the appended claims.

Modified forms of the improved drill and lathe are shown in Figs. 11 to 17 and in this instance the motor 44 is in line with the tool and the armature shaft is appropriately journalled while the said motor is held rigid. The shaft so carries at its end the chuck 81 for the drill 82.

By the arrangement shown in Fig. 11 the usual base 10, ring 13 and bar 15 are provided and the standard 16 carries the adjustable box 24 in which is clamped by means of the screw 83 a stem 84 of the head 85 with a guide channel for a slide 86.

This slide 86 has at its side a rack bar 87 that is engaged by a pinion on a shaft 88 and rotated by the handle 89 so that while the box and slide may be moved and adjusted horizontally by the screw 29, the slide may be adjusted vertically by the handle 89.

The handle 89 and its hub in Fig. 11 are shown in dotted lines so as not to hide the construction above referred to.

The slide 86 carries a yoke 90 in which the shaft 80 is journalled and which is similar to the yoke 40 already described and has the locking bolt 64 operated by the handle 66 to secure it to the said slide. An upright 91 forms a part of the slide 86 and is adapted to support the motor 44 through the radial arm 92 which is clamped to the upright by means of the screw 93. The stop 94 that is secured to the upright limits the downward movement of the motor and drill so as to prevent injury to a chuck or work holder that may be on the base.

Fig. 11 shows a side view of this arrangement and Fig. 12 is a front view wherein the drill is upright and adapted to operate vertically, Fig. 11 showing the work holder 94 mounted on ball bearings 95.

The motor 44 and the drill as connected in one piece is shown mounted horizontally on the base 10 by means of the arm 92 and the clamping screw 96 in Fig. 13. The arm 92 is carried by a bar 97 that screws into the head 98 and the arm is limited in adjustment by the stops 99.

The head 98 is supported by the stem 100 in the base block 11 and has the dovetail channel 101 (Fig. 15) in which the slide 102 operates and is held rigid by the screw 103. This slide 102 is similar to slide 86 in Fig. 11 and has a rack bar 104 operated by a pinion 105.

The stem 100 has a groove 106 to receive the locking bolt 107 in the base block 11 with a flattened side to receive or release the stem.

To the slide 102 is secured the yoke 108 by means of a locking bolt similar to 64 operated by the handle 66 and in the groove 109 of the slide and this yoke is a bearing for the shaft 80.

An extension device and tool rest carrier is shown in Fig. 13 and in detail in Fig. 17 and consists of a block 111 provided with a horizontal bar 110 that is adapted to slide in a small head 112 and fit in a socket in the head 98. The small head 112 has a rigid bar 113 extending horizontally from it and that is adapted to fit in a recess in the head 98. The block 111 has a locking bolt to attach a tool rest and the two bars 110 and 113 may be drawn out so that the tool rest may be located any distance from the tool 82 and so that work may be performed on any article carried by the chuck 81.

These constructions show the adaptation of a small and portable lathe and drill for jewelers' work and capable of practically universal operation and readily assembled or taken apart.

What I claim as new is:

1. In a combined lathe and drill of the nature described, the combination of a pivoted head, a universal moving support for the head, a barrel longitudinally adjustable in said head, a spindle and chuck in said barrel, means in the spindle for adjusting the chuck, a motor on the barrel and adapted to rotate the spindle.

2. In an article of the nature described, the combination of an adjustable support, a head pivoted on the support, a barrel adapted to be longitudinally moved in the head, a spindle adapted to be rotated and be longitudinally adjusted in the barrel jaws at the lower end of the spindle and adapted to be operated by its longitudinal adjustment, a motor carried by the barrel and adapted to rotate the spindle, and connecting means between the motor and the spindle.

3. In an article of the nature described, the combination of an adjustable support, a pivoted head carried by the support, a barrel longitudinally adjustable in the head, a rack on the barrel and a pinion in the head to adjust said barrel, a chuck spindle in the barrel, a bracket carried by the barrel, and a motor carried by the bracket to drive the spindle.

4. In an article of the nature described, the combination of an adjustable upright, a head pivoted in the same, a barrel adjustable longitudinally in the head, jaws at the upper end of the barrel and constituting bearings, a chuck spindle adapted to rotate in the barrel and the jaws, a cone pulley on the barrel, a depending bracket from the jaws and adapted to carry a motor, locking clamps on the jaws adapted to secure the bracket, and a rack and pinion carried by the head and adapted to effect the adjustment of the barrel.

In testimony whereof I hereunto affix my signature.

ARTHUR S. THOMPSON.